UNITED STATES PATENT OFFICE.

FRITZ HUGO TRITSCHLER, OF BASEL, SWITZERLAND, ASSIGNOR TO F. HOFFMANN-LA ROCHE & CO., OF BASEL, SWITZERLAND.

THEOBROMIN-SODIUM FORMATE AND PROCESS OF MAKING SAME.

No. 799,764.      Specification of Letters Patent.      Patented Sept. 19, 1905.

Application filed June 23, 1905. Serial No. 266,672.

*To all whom it may concern:*

Be it known that I, FRITZ HUGO TRITSCHLER, pharmaceutical chemist, a subject of the King of Würtemberg, residing at Basel, Switzerland, have invented certain new and useful Improvements Relating to Compounds or Salts of Theobromin, of which the following is a specification.

It is well known that theobromin is distinguished from the other xanthin bases by its diuretic effect; but its practical application is impeded by the production of unpleasant secondary effects, its slightly toxic action, and the fact that it is sparingly soluble in water.

The solubility may be increased by the production of double salts, but hitherto only at the expense of its diuretic action, which is the case, for instance, with theobromin-sodium salicylate. Seeing, however, that sodium formate is already known as a non-poisonous diuretic, attempts were made to produce the double salt: theobromin-sodium formate.

For producing pure theobromin-sodium formate pure theobromin sodium and pure sodium formate may be used as raw materials or as starting-points. For obtaining the former theobromin is dissolved in a quantity of soda solution slightly in excess of the calculated quantity, and to the filtered solution is added from six to eight times its volume of alcohol. The theobromin sodium which separates out is sucked off, washed with alcohol, and dried. For producing anhydrous sodium formate strong (caustic) soda solution may be neutralized with formic acid until the reaction becomes slightly acid, after which the filtered solution is boiled down and the solid residue thereby obtained is dried at 120° centigrade.

The details of procedure may be as follows: 70.1 parts of sodium theobromin (corresponding to 62.5 parts of theobromin) are dissolved in two hundred parts of water, after which a solution of 23.5 parts of anhydrous sodium formate (also called "sodium formate") in fifty parts of water is added. The mixture is filtered and concentrated to dryness on a steam-bath.

The quantities of sodium theobromin and sodium formate mentioned above correspond to molecular proportions. The resulting salt corresponds to the formula

$$NaC_7H_7N_4O_2 + NaOOCH + H_2O$$

and contains 62.5 per cent. of theobromin, 23.5 per cent. of anhydrous sodium formate, and 6.4 per cent. of water. It is a white powder of a bitter saline taste, easily soluble in water, thereby forming a solution with alkaline reaction, and differing from theobromin chiefly by the fact that it is not poisonous. Acetic acid precipitates from its aqueous solution theobromin, and the presence of formic acid in the filtrate may be demonstrated by the reduction of silver nitrate.

The theobromin-sodium formate is a strong diuretic.

What I claim is—

1. The process for the production of theobromin-sodium formate, which consists in causing sodium theobromin and anhydrous sodium formate to act upon each other in aqueous solution, substantially as described.

2. The process for the production of theobromin-sodium formate, which consists in causing sodium theobromin and anhydrous sodium formate in molecular proportions to act upon each other in aqueous solution.

3. As a new product of manufacture, theobromin-sodium formate

$$NaC_7H_7N_4O_2 + NaCOOH + H_2O$$

containing approximately 62.5 per cent. of theobromin, 23.5 per cent. of anhydrous sodium formate and 6.4 per cent. of water, the said product in its dry condition being a white powder, of a bitter saline taste, yielding with water an alkaline solution, capable of yielding theobromin on the addition of acetic acid to its solution, while formic acid enters into solution, the said product being obtainable as described and applicable as a diuretic.

In testimony whereof I have set my hand hereunto in the presence of two subscribing witnesses.

FRITZ HUGO TRITSCHLER.

Witnesses:
    ALBERT GRAEBER,
    GEO. GIFFORD.